United States Patent
Bourane et al.

(10) Patent No.: US 9,574,142 B2
(45) Date of Patent: Feb. 21, 2017

(54) PROCESS FOR OXIDATIVE DESULFURIZATION AND SULFONE MANAGEMENT BY GASIFICATION

(75) Inventors: Abdennour Bourane, Ras Tanura (SA); Omer Refa Koseoglu, Dhahran (SA); Stephane Cyrille Kressmann, Dhahran (SA)

(73) Assignee: SAUDI ARABIAN OIL COMPANY (SA)

(*) Notice: Subject to any disclaimer, the term of this patent is extended or adjusted under 35 U.S.C. 154(b) by 0 days.

(21) Appl. No.: 12/876,822

(22) Filed: Sep. 7, 2010

(65) Prior Publication Data

US 2012/0055849 A1   Mar. 8, 2012

(51) Int. Cl.
*C10G 27/04* (2006.01)
*C10G 21/20* (2006.01)
(Continued)

(52) U.S. Cl.
CPC ............. *C10G 53/04* (2013.01); *C01B 3/386* (2013.01); *C10G 21/12* (2013.01); *C10G 27/04* (2013.01); *C10G 27/12* (2013.01); *C10G 27/14* (2013.01); *C10G 53/14* (2013.01); *C01B 2203/0261* (2013.01); *C01B 2203/127* (2013.01);
(Continued)

(58) Field of Classification Search
CPC .......... C01B 2203/0261; C01B 2203/127; C01B 2203/84; C01B 3/386; C10G 21/12; C10G 2300/1037; C10G 2300/1055; C10G 2300/202; C10G 2300/207; C10G 2300/44; C10G 27/04; C10G 27/12; C10G 27/14; C10G 53/04; C10G 53/14; C10J 2300/1665; C10J 2300/1807
(Continued)

(56) References Cited

U.S. PATENT DOCUMENTS

| 2,704,295 | A | | 3/1955 | Gilbert et al. |
| 2,993,841 | A | * | 7/1961 | Sarno .................. C07C 7/08 203/51 |

(Continued)

FOREIGN PATENT DOCUMENTS

| JP | 4215835 A | 8/1992 |
| JP | 4353225 A | 12/1992 |

(Continued)

OTHER PUBLICATIONS

International Search Report and Written Opinion issued in PCT Application No. PCT/US2011/050592, dated Dec. 13, 2011 (10 pages).

(Continued)

*Primary Examiner* — Renee E Robinson
*Assistant Examiner* — Derek Mueller
(74) *Attorney, Agent, or Firm* — Bracewell LLP; Constance Gall Rhebergen; Brad Y. Chin (57) ABSTRACT

A method and apparatus for upgrading a hydrocarbon feedstock is provided. The method includes the steps of (a) supplying a hydrocarbon feedstock to an oxidation reactor, wherein the hydrocarbon feedstock is oxidized in the presence of a catalyst under conditions sufficient to selectively oxidize sulfur compounds present in the hydrocarbon feedstock; (c) separating the hydrocarbons and the oxidized sulfur compounds by solvent extraction; (d) collecting a residue stream that includes the oxidized sulfur compounds; and (e) supplying the residue stream to a gasifier to produce a syngas stream and a hydrogen sulfide stream.

19 Claims, 8 Drawing Sheets

(51) Int. Cl.

| | | |
|---|---|---|
| *C10G 53/14* | (2006.01) | |
| *C10G 53/04* | (2006.01) | |
| *C10G 21/12* | (2006.01) | |
| *C10G 27/12* | (2006.01) | |
| *C10G 27/14* | (2006.01) | |
| *C01B 3/38* | (2006.01) | |

(52) U.S. Cl.
CPC .. *C01B 2203/84* (2013.01); *C10G 2300/1037* (2013.01); *C10G 2300/1055* (2013.01); *C10G 2300/202* (2013.01); *C10G 2300/207* (2013.01); *C10G 2300/44* (2013.01); *C10J 2300/1665* (2013.01); *C10J 2300/1807* (2013.01)

(58) Field of Classification Search
USPC ................................ 208/208 R, 240, 249
See application file for complete search history.

(56) References Cited

U.S. PATENT DOCUMENTS

| | | | |
|---|---|---|---|
| 4,202,672 A | 5/1980 | Schuurman | |
| 4,481,101 A | 11/1984 | Yan | |
| 4,818,252 A | 4/1989 | Kohnen et al. | |
| 4,959,080 A | 9/1990 | Sternling | |
| 5,435,940 A | 7/1995 | Doering et al. | |
| 5,767,332 A | 6/1998 | Vollmer et al. | |
| 5,904,477 A | 5/1999 | Van Dam et al. | |
| 6,087,544 A | 7/2000 | Wittenbrink et al. | |
| 6,160,193 A | 12/2000 | Gore | |
| 6,277,271 B1 | 8/2001 | Kocal | |
| 7,001,502 B1 | 2/2006 | Satchwell et al. | |
| 7,232,516 B2 | 6/2007 | Sughrue, II et al. | |
| 7,270,737 B2 | 9/2007 | Picard et al. | |
| 2005/0150819 A1 | 7/2005 | Wachs | |
| 2005/0189261 A1* | 9/2005 | Briot et al. | 208/243 |
| 2007/0051043 A1 | 3/2007 | Schingnitz et al. | |
| 2007/0051667 A1 | 3/2007 | Martinie et al. | |
| 2007/0062117 A1 | 3/2007 | Schingnitz et al. | |
| 2007/0079554 A1 | 4/2007 | Schingnitz et al. | |
| 2007/0102323 A1* | 5/2007 | Lee et al. | 208/208 R |
| 2007/0225382 A1 | 9/2007 | Van Den Berg et al. | |
| 2008/0000404 A1 | 1/2008 | Fischer et al. | |
| 2008/0047196 A1 | 2/2008 | Schingnitz | |
| 2008/0256860 A1 | 10/2008 | Von Kossak-Glowczewski | |
| 2009/0029299 A1 | 1/2009 | Fischer et al. | |

FOREIGN PATENT DOCUMENTS

| | | |
|---|---|---|
| WO | 9513339 A1 | 5/1995 |
| WO | 0218518 A1 | 3/2002 |
| WO | 03014266 A1 | 2/2003 |
| WO | 2006032644 A1 | 3/2006 |
| WO | 2006071793 A1 | 7/2006 |

OTHER PUBLICATIONS

Ebbe R. Skov, et al. "The ULSD oxidative desulfurisation option", Hydrocarbon Engineering, May 31, 2007 (5 pages).
John J. Marano "Refinery Technology Profiles Gasification and Supporting Technologies", U.S. Department of Energy, Jun. 30, 2003 (27 pages).
PCT Written Opinion of the International Preliminary Examining Authority dated Feb. 1, 2013; International Application No. PCT/US2011/050592; International Filing Date: Sep. 7, 2011.

* cited by examiner

PROCESS FOR OXIDATIVE DESULFURIZATION AND SULFONE MANAGEMENT BY GASIFICATION

FIELD OF THE INVENTION

This invention relates to a method and apparatus for desulfurizing a hydrocarbon feedstock. More specifically, the present invention relates to a method and apparatus for oxidative desulfurization of a hydrocarbon stream and the subsequent gasification of oxidized sulfur and nitrogen containing compounds to produce hydrogen, steam, and energy.

BACKGROUND OF THE INVENTION

Crude oil is the world's main source of hydrocarbons used as fuel and petrochemical feedstock. At the same time, petroleum and petroleum based products are also a major source for air and water pollution today. To address growing concerns surrounding pollution caused by petroleum and petroleum based products, many countries have implemented strict regulations on petroleum products, particularly on petroleum refining operations and the allowable concentrations of specific pollutants in fuels, such as the allowable sulfur and nitrogen content in gasoline fuels. While the exact compositions of natural petroleum or crude oils vary significantly, all crude oils contain some measurable amount of sulfur compounds and most crude oils also contain some measurable amount of nitrogen compounds. In addition, crude oils may also contain oxygen, however oxygen content of most crude is generally low. Sulfur concentrations in crude oils are typically less than about 5 percent by weight, with most crude oils having sulfur concentrations in the range from about 0.5 to about 1.5% by weight. Nitrogen concentrations of most crude oils are usually less than 0.2 percent by weight, but can be as high as 1.6% by weight. In the United States, motor gasoline fuel is regulated to have a maximum total sulfur content of less than 10 ppm sulfur, thus removal of sulfur is a key concern.

Crude oils are refined in oil refineries to produce transportation fuels and petrochemical feedstocks. Typically fuels for transportation are produced by processing and blending of distilled fractions from the crude oil to meet the particular end use specifications. Because most of the crudes generally available today have high concentrations of sulfur, the distilled fractions will require some desulfurization to yield products which meet various performance specifications and/or environmental standards.

The sulfur-containing organic compounds present in crude oils and resulting refined fuels can be a major source of environmental pollution. The sulfur compounds are typically converted to sulfur oxides during the combustion process, which in turn can produce sulfur oxyacids and contribute to particulate emissions, both of which are desired to be reduced.

One method for reducing particulate emissions can include the addition of various oxygenated fuel blending compounds and/or compounds that contain few or no carbon-to-carbon chemical bonds, such as methanol and dimethyl ether. Most of these fuel blending compounds, however, suffer in that they can have high vapor pressures, can be nearly insoluble in diesel fuel, and/or have poor ignition quality, as indicated by their cetane numbers.

Hydrotreating and hydrogenation are alternate techniques currently used for the removal of sulfur and/or nitrogen from hydrocarbons. Diesel fuels that have been treated by chemical hydrotreating and/or hydrogenation to reduce the content of sulfur and aromatic compounds frequently have a reduced fuel lubricity, which in turn can cause excessive wear of fuel pumps, injectors and other moving parts that come in contact with the fuel under high pressures.

For example, middle distillates (a distillate fraction that nominally boils in the range of about 180-370° C.) can be used directly as a fuel, or alternatively can be used as a blending component of fuel for use in compression ignition internal combustion engines (i.e., diesel engines). The middle distillate fraction, however, typically include between about 1 and 3% by weight sulfur, which is greater than allowable sulfur concentration of middle distillate fractions, which, since 1993, have been reduced in Europe and United States to between a currently allowed amount of about 5-50 part per million weight (ppmw) levels from the 3000 ppmw level.

Conventional techniques currently employed for the removal of sulfur and nitrogen compounds typically still require the subsequent recovery and/or disposal of the sulfur and nitrogen containing compounds that are removed from the hydrocarbons. In order to comply with the increasingly stringent regulations for ultra-low sulfur content fuels, refiners must make fuels having even lower sulfur levels at the refinery gate so that they can meet the strict specifications after blending.

Low pressure conventional hydrodesulfurization (HDS) processes can be used to remove a major portion of the sulfur from petroleum distillates for the eventual blending of refinery transportation fuels. These desulfurization units, however, are not very efficient at removing sulfur from compounds at mild conditions (i.e., up to about 30 bar pressure), or when the sulfur atom is sterically hindered, as is the case in multi-ring aromatic sulfur compounds. This is particularly true where the sulfur heteroatom is hindered by two alkyl groups (e.g., 4,6-dimethyldibenzothiophene). Because of the difficulty in the removal of sulfur from sterically hindered compounds, dibenzothiophenes predominate at low sulfur levels such as 50 to 100 ppmw. Severe operating conditions (e.g., high hydrogen partial pressure, high temperature, and/or high catalyst volume) typically must be utilized in order to remove the sulfur from these refractory sulfur compounds. Increasing the hydrogen partial pressure can only be achieved by increasing the recycle gas purity, or new grassroots units must be designed, which can be a very a costly option. The use of severe operating conditions typically results in decreased yield, reduced catalyst life cycle, and product quality deterioration (e.g., color), and therefore are typically sought to be avoided.

Conventional methods for petroleum upgrading, specifically for the removal of sulfur and/or nitrogen containing compounds, however, typically suffer from various limitations and drawbacks. For example, hydrogenative methods typically require large amounts of hydrogen gas to be supplied from an external source to attain desired level of upgrading and conversion. These methods can also suffer from premature or rapid deactivation of catalyst, as is typically the case during the hydrotreatment of a heavy feedstock and/or hydrotreatment under harsh conditions, thus requiring regeneration of the catalyst and/or addition of new catalyst, which in turn can lead to process unit downtime. Thermal methods, on the other hand, frequently suffer from the production of large amounts of coke as a byproduct and a limited ability to remove impurities, such as, sulfur and nitrogen, in addition to the large energy requirements associated with these processes. Additionally, thermal methods require specialized equipment suitable for severe conditions (high temperature and high pressure), and require the input of significant energy, thereby resulting in increased complexity and cost.

Thus, there exists a need to provide methods for the upgrading of hydrocarbon feedstocks, particularly processes for the desulfurization and/or denitrogenation of hydrocarbon feedstocks that use low severity conditions that can also provide means for the recovery and disposal of usable sulfur and/or nitrogen compounds.

SUMMARY

The current invention provides a method and apparatus for the upgrading of a hydrocarbon feedstock that removes a major portion of the sulfur containing compounds present in the feedstock and in turn utilizes these sulfur containing compounds in an associated process. Removal of nitrogen containing compounds from the feedstock can similarly be achieved by the method and apparatus.

In one aspect, a method of upgrading a hydrocarbon feedstock is provided. The method includes the steps of (a) supplying a hydrocarbon feedstock to an oxidation reactor, wherein the hydrocarbon feedstock includes sulfur compounds; (b) contacting the hydrocarbon feedstock with an oxidant in the presence of a catalyst in the oxidation reactor under conditions sufficient to selectively oxidize sulfur compounds present in the hydrocarbon feedstock to produce an oxidized hydrocarbon stream that includes hydrocarbons and oxidized sulfur compounds; (c) separating the hydrocarbons and the oxidized sulfur compounds by solvent extraction with a polar solvent to produce an extracted hydrocarbon stream and a mixed stream, wherein the mixed stream includes the polar solvent and the oxidized sulfur compounds, and wherein the extracted hydrocarbon stream has a lower concentration of sulfur compounds than the hydrocarbon feedstock; (d) separating the mixed stream into a first recovered polar solvent stream and a first residue stream; and (e) supplying the first residue stream to a solvent gasifier to produce a syngas stream and a hydrogen sulfide stream.

In certain embodiments, the oxidants are selected from the group consisting of air, oxygen, ozone, nitrous oxide, peroxides, hydroperoxides, organic peracids, and combinations thereof. In certain embodiments, the catalyst is a metal oxide having the formula $M_xO_y$, wherein M is an element selected from Groups IVB, VB, and VIB of the periodic table. In certain embodiments, the polar solvent has a Hildebrandt value of greater than about 19.

In another aspect, the present invention provides a method of upgrading a hydrocarbon feedstock. The method includes the step of supplying the hydrocarbon feedstock that includes sulfur compounds to an oxidation reactor, and contacting the hydrocarbon feedstock in the oxidation reactor with an oxidant in the presence of a catalyst, under conditions sufficient to selectively oxidize sulfur compounds present in the hydrocarbon feedstock to produce an oxidized hydrocarbon stream that comprises hydrocarbons and oxidized sulfur compounds. Hydrocarbons and the oxidized sulfur compounds in the oxidized hydrocarbon stream are separated by solvent extraction with a polar solvent to produce an extracted hydrocarbon stream and a mixed stream, wherein the mixed stream includes the polar solvent and the oxidized sulfur compounds, and wherein the extracted hydrocarbon stream has a lower concentration of sulfur compounds than the hydrocarbon feedstock. The mixed stream is separated into a first recovered polar solvent stream and a first residue stream. The first residue stream is supplied to a gasifier to produce a syngas stream and a hydrogen sulfide stream.

In certain embodiments, the method further includes the step of supplying the extracted hydrocarbon stream to a stripper to produce a second recovered polar solvent stream and a stripped hydrocarbon stream. The method can further include the step of supplying the extracted hydrocarbon stream to an adsorption column, wherein the adsorption column is charged with an adsorbent suitable for the removal of oxidized compounds present in the extracted hydrocarbon stream, to produce a high purity hydrocarbon product stream and a second residue stream, wherein the second residue stream includes a portion of the oxidized compounds.

In another embodiment, a method of providing a desulfurized hydrocarbon stream and a syngas stream from a sulfur containing hydrocarbon feedstock is provided. The method includes the steps of supplying the sulfur containing hydrocarbon feedstock to an oxidation reactor, and catalytically oxidizing the sulfur compounds present in the hydrocarbon feedstock in the oxidation reactor with an oxidant in the presence of a catalyst under conditions sufficient to selectively oxidize at least a portion of the sulfur compounds present in the hydrocarbon feedstock to sulfones, and to produce an oxidized hydrocarbon stream that includes hydrocarbons and sulfones. The oxidized hydrocarbon stream is selectively extracted with a polar organic solvent to produce an extracted hydrocarbon stream and a mixed stream, wherein the mixed stream includes the polar organic solvent and sulfones, and wherein the extracted hydrocarbon stream has a lower sulfur concentration than the hydrocarbon feedstock. The mixed stream is separated into a first recovered polar solvent stream and a first residue stream, which includes sulfones. The extracted hydrocarbon stream is supplied to a stripper that is operable to separate the extracted hydrocarbon stream into a stripped oil stream and a second recovered polar solvent stream. Optionally, at least a portion of the first and second recovered polar solvent streams can be supplied to the extraction step. The residue stream, which includes sulfones, is supplied to a gasifier and oxidized with an oxidant to produce a syngas stream and a hydrogen sulfide stream.

DETAILED DESCRIPTION OF THE INVENTION

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein and provided in the appended figures are set forth without any loss of generality, and without imposing limitations, relating to the claimed invention.

The present invention addresses known problems associated with prior art methods for upgrading a hydrocarbon feedstock, particularly the desulfurization and denitrogenation of hydrocarbon feedstocks, and the subsequent removal and recovery of usable sulfur compounds. In one aspect, the present invention provides a method for the removal of sulfur from a hydrocarbon feedstock and the use of oxidized sulfur containing species in a gasification process to produce hydrogen, steam, and energy.

As used herein, the terms "upgrading" or "upgraded", with respect to petroleum or hydrocarbons refers to a petroleum or hydrocarbon product that is lighter (i.e., has fewer carbon atoms, such as methane, ethane, propane . . . ), has a higher API gravity, higher middle distillate yield, lower sulfur content, lower nitrogen content, or lower metal content, than does the original petroleum or hydrocarbon feedstock.

Figure 1:
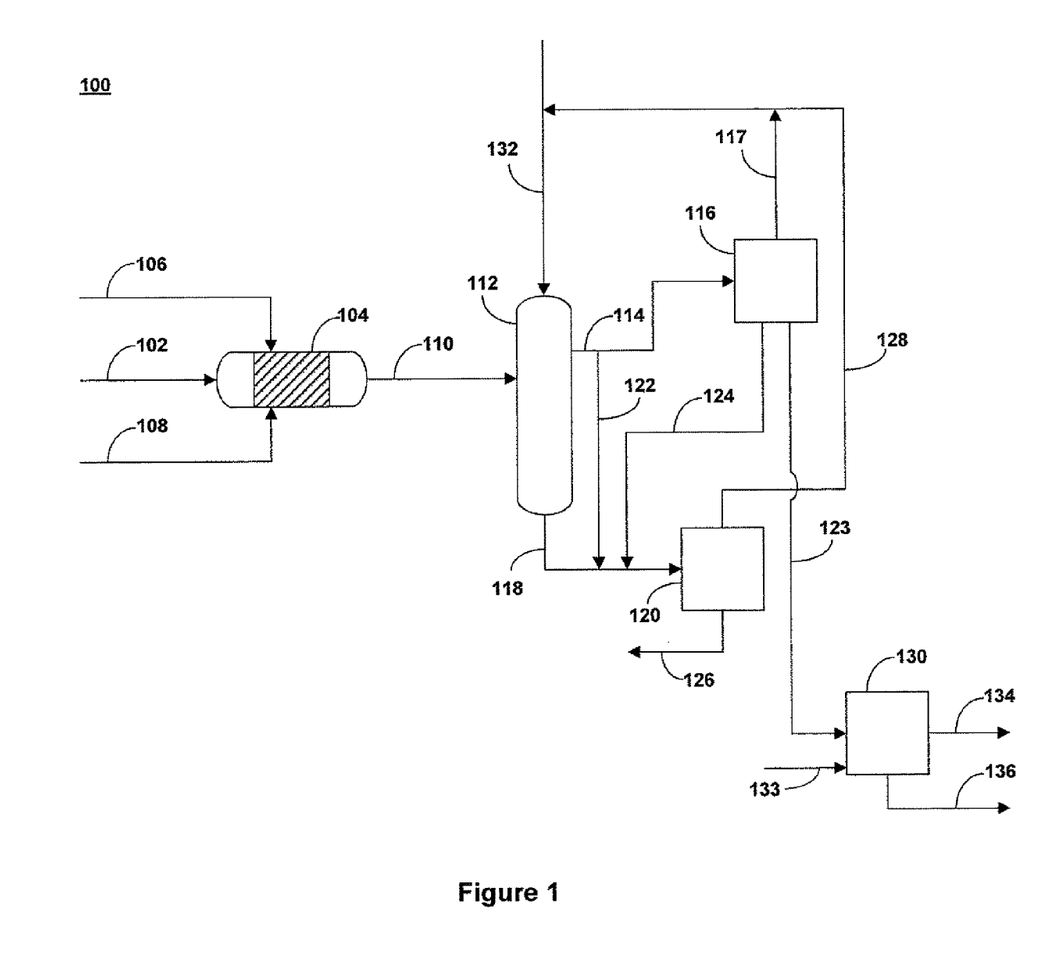
FIG. 1 provides a schematic diagram of one embodiment of the method of upgrading a hydrocarbon feedstock according to the present invention.

FIG. 1 provides one embodiment of the present invention for the upgrading of hydrocarbons. Hydrocarbon upgrading system 100 includes oxidation reactor 104, extraction vessel 112, solvent regeneration column 116, stripper 120 and gasifier 130, also referred to as a gasification reactor or a gasification unit.

In one aspect, the present invention provides a method for the upgrading of a hydrocarbon feedstock, particularly a hydrocarbon feedstock that includes sulfur containing compounds. In certain embodiments, the hydrocarbon feedstock can include nitrogen containing species that can also be oxidized and removed in addition to or instead of the sulfur species. The method includes supplying hydrocarbon feedstock 102 to oxidation reactor 104, where the hydrocarbon feedstock is contacted with an oxidant and a catalyst. The oxidant can be supplied to oxidation reactor 104 via oxidant feed line 106 and fresh catalyst can be supplied to the reactor via catalyst feed line 108. In certain embodiments, the catalyst can be regenerated from this or another process, and supplied along with, or in the place of, fresh catalyst.

Hydrocarbon feedstock 102 can be any petroleum based hydrocarbon, and can include various impurities, such as elemental sulfur, and/or compounds that include sulfur and/or nitrogen. In certain embodiments, hydrocarbon feedstock 102 can be a diesel oil having a boiling point between about 150° C. and 400° C. Alternatively, hydrocarbon feedstock 102 can have a boiling point up to about 450° C., alternatively up to about 500° C. Alternatively, in certain embodiments, hydrocarbon feedstock 102 can have a boiling point between about 100° C. and 500° C. Optionally, hydrocarbon feedstock 102 can have a boiling point up to about 600° C., alternatively up to about 700° C., or, in certain embodiments, greater than about 700° C. In certain embodiments, hydrocarbon feedstock 102 can include heavy hydrocarbons. As used herein, heavy hydrocarbons refers to hydrocarbons having a boiling point of greater than about 360° C., and can include aromatic hydrocarbons and naphthenes, as well as alkanes and alkenes. Generally, in certain embodiments, hydrocarbon feedstock 102 can be selected from whole range crude oil, topped crude oil, product streams from oil refineries, product streams from refinery steam cracking processes, liquefied coals, liquid products recovered from oil or tar sand, bitumen, oil shale, asphaltene, and the like, and mixtures thereof.

Exemplary sulfur compounds present in hydrocarbon feedstock 102 can include sulfides, disulfides, and mercaptans, as well as aromatic molecules such as thiophenes, benzothiophenes, dibenzothiophenes, and alkyl dibenzothiophenes, such as 4,6-dimethyldibenzothiophene. Aromatic compounds are typically more abundant in higher boiling fractions, than is typically found in the lower boiling fractions.

As noted previously, in certain embodiments the feedstock can include nitrogen containing compounds present in hydrocarbon feedstock 102, and in certain embodiments exemplary compounds can include basic and neutral nitrogen compounds, including indoles, carbazoles, anilines, quinolines, acridines, and the like.

Oxidation reactor 104 can be operated at mild conditions. More specifically, in certain embodiments, oxidation reactor 104 can be maintained at a temperature of between about 20° C. and about 150° C., alternatively between about 30° C. and about 150° C., alternatively between about 30° C. and about 90° C., or between about 90° C. and about 150° C. In certain embodiments, the temperature is preferably between about 30° C. and about 75° C., more preferably between about 45° C. and 60° C. The operating pressure of oxidation reactor 104 can be between about 1 and 80 bars, alternatively between about 1 and 30 bars, alternatively between about 1 and 15 bars, and preferably between about 2 and 3 bars. The residence time of the hydrocarbon feedstock within oxidation rector 102 can be between about 1 and 180 minutes, alternatively between about 15 and 180 minutes, alternatively between about 15 and 90 minutes, alternatively between about 5 and 60 minutes, alternatively between about 60 and 120 minutes, alternatively between about 120 and 180 minutes, and is preferably for a sufficient amount of time for the oxidation of any sulfur or nitrogen compounds present in the hydrocarbon feedstock. In one embodiment, the residence time of the hydrocarbon feedstock within oxidation rector 104 is between about 15 and 45 minutes. For comparison, conventional hydrodesulfurization of diesel type feedstocks are typically conducted under harsher conditions, for example, at temperatures of between about 330 and 380° C., pressures of between about 50 and 80 Kg/cm$^2$, and LHSV of between about 0.5 and 2 h$^{-1}$.

Oxidation reactor 104 can be any reactor suitably configured to ensure sufficient contacting between hydrocarbon feedstock 102 and the oxidant, in the presence of a catalyst, for the oxidation of at least a portion of the sulfur and nitrogen containing compounds contained therein. Suitable reactors for oxidation reactor 104 can include batch reactors, fixed bed reactors, ebbulated bed reactors, lifted reactors, fluidized bed reactors, slurry bed reactors, and the like. Certain sulfur and nitrogen compounds present in hydrocarbon feedstock 102 can be oxidized in oxidation reactor 104 to sulfones, sulfoxides, and various oxidized nitrogen compounds, all of which can be subsequently removed by extraction and/or adsorption. Exemplary oxidized nitrogen compounds can include pyridine and pyrrole-based compounds or pyridine-difuran compounds. Frequently, during oxidation, the nitrogen atom itself is not oxidized, but rather the compound is oxidized to a compound that is easy to separate from the remaining compounds.

The oxidant is supplied to oxidation reactor 104 via oxidant feed stream 106. Suitable oxidants can include air, oxygen, ozone, hydrogen peroxide, organic peroxides, hydroperoxides, organic peracids, peroxo acids, oxides of nitrogen, such as nitrous oxide, and the like, and combinations thereof. Exemplary peroxides can include hydrogen peroxide, and the like. Exemplary hydroperoxides can include t-butyl hydroperoxide, and the like. Exemplary organic peracids can include peracetic acid, and the like.

The mole ratio of oxidant to sulfur present in the hydrocarbon feedstock can be from about 1:1 to 100:1, preferably between about 1:1 and 30:1, more preferably between about 1:1 and 20:1.

In certain other embodiments, such as in a hydrocarbon feedstock having a greater concentration of nitrogen than sulfur, for example, certain South American crude oils, certain African crude oils, certain Russian crude oils, certain Chinese crude oils, and certain intermediate refinery streams like coker, thermal cracking, visbreaking, FCC cycle oils, and the like, the mole ratio of oxidant to nitrogen present in the hydrocarbon feedstock can be from about 1:1 to 50:1, preferably between about 2:1 and 20:1, more preferably between about 4:1 and 10:1.

The catalyst can be supplied to oxidation reactor 104 via catalyst feed stream 108. The catalyst can include at least one metal oxide having the chemical formula $M_xO_y$, wherein M is a metal selected from groups IVB, VB, or VIB of the periodic table. Exemplary metals can include titanium, vanadium, chromium, molybdenum, and tungsten. Certain preferred metals include oxides of molybdenum and tungsten. In certain embodiments, such as the use of aqueous oxidants, spent catalyst can be removed from the system with the aqueous phase, after the oxidation vessel.

The ratio of catalyst to oil is between about 0.1% by weight and about 10% by weight, preferably between about 0.5% by weight and about 5% by weight. In certain embodiments, the ratio is between about 0.5% by weight and about 2.5% by weight. Alternatively, the ratio is between about 2.5% by weight and about 5% by weight.

Catalyst present in oxidation reactor 104 can increase the rate of oxidation of the various sulfur and nitrogen containing compounds in hydrocarbon feedstock 102, thereby achieving completion of the reaction and oxidation of sulfur and nitrogen containing compounds in a shorter amount of time, and reducing the amount of oxidant necessary to achieve oxidation of the sulfur and nitrogen containing compounds. In certain embodiments, the catalyst can be selective toward the oxidation of sulfur containing compounds. In preferred embodiments, the catalyst is selective to minimizing the oxidation of aromatic hydrocarbons present in the hydrocarbon feedstock.

The composition of spent oxidant will vary based upon what original oxidant is used in the process. For example, in embodiments wherein the oxidant is hydrogen peroxide, water is formed as a by-product of the oxidation reaction. In embodiments wherein the oxidant is an organic peroxide, alcohol is formed as a by-product of the oxidation reaction. By-products are typically removed during the extraction and solvent recovery steps.

Oxidation reactor 104 produces oxidized sulfur and oxidized nitrogen containing hydrocarbon stream 110, which can include hydrocarbons and oxidized sulfur and oxidized nitrogen containing species. Oxidized sulfur and oxidized nitrogen containing hydrocarbon stream 110 is supplied to extraction vessel 112 where the oxidized sulfur and oxidized nitrogen containing hydrocarbon species present with hydrocarbons in stream 110 can be contacted with extraction solvent stream 132. The extraction solvent can be a polar solvent, and in certain embodiments, can have a Hildebrandt solubility value of greater than about 19. In certain embodiments, when selecting the particular polar solvent for use in extracting oxidized sulfur and nitrogen containing species, selection may be based upon, in part, solvent density, boiling point, freezing point, viscosity, and surface tension. Exemplary polar solvents suitable for use in the extraction step can include acetone (Hildebrand value of 19.7), carbon disulfide (20.5), pyridine (21.7), dimethyl sulfoxide (DMSO) (26.4), n-propanol (24.9), ethanol (26.2), n-butyl alcohol (28.7), propylene glycol (30.7), ethylene glycol (34.9), dimethylformamide (DMF) (24.7), acetonitrile (30), methanol (29.7), and like compositions or compositions having similar physical and chemical properties. In certain embodiments, acetonitrile and methanol, due to their low cost, volatility, and polarity, are preferred. In certain embodiments, solvents that include sulfur, nitrogen, or phosphorous, preferably have a relatively high volatility to ensure adequate stripping of the solvent from the hydrocarbon feedstock.

In preferred embodiments, the extraction solvent is non-acidic. The use of acids is typically avoided due to the corrosive nature of acids, and the requirement that all equipment be specifically designed for a corrosive environment. In addition, the use of acids, such as acetic acid, can present difficulties in separation due to the formation of emulsions.

Extraction vessel 112 can be operated at a temperature of between about 20° C. and 60° C., preferably between about 25° C. and 45° C., even more preferably between about 25° C. and 35° C. Extraction vessel 112 can operate at a pressure of between about 1 and 10 bars, preferably between about 1 and 5 bars, more preferably between about 1 and 2 bars. In certain embodiments, extraction vessel 112 operates at a pressure of between about 2 and 6 bars.

The ratio of the extraction solvent to hydrocarbon feedstock can be between about 1:3 and 3:1, preferably between about 1:2 and 2:1, more preferably about 1:1. Contact time between the extraction solvent and oxidized sulfur and oxidized nitrogen containing hydrocarbon stream 110 can be between about 1 second and 60 minutes, preferably between about 1 second and about 10 minutes. In certain preferred embodiments, the contact time between the extraction solvent and oxidized sulfur and oxidized nitrogen containing hydrocarbon stream 110 is less than about 15 minutes. In certain embodiments, extraction vessel 112 can include various means for increasing the contact time between the extraction solvent and oxidized sulfur and oxidized nitrogen containing hydrocarbon stream 110, or for increasing the degree of mixing of the two solvents. Means for mixing can include mechanical stirrers or agitators, trays, or like means.

The extraction vessel produces mixed stream 114 that can include extraction solvent, oxidized species (e.g., the oxidized sulfur and nitrogen species that were originally present in hydrocarbon feedstock 102), and traces of the hydrocarbon feedstock, and extracted hydrocarbon stream 118, which can include the hydrocarbon feedstock having a reduced sulfur and low nitrogen content, relative to hydrocarbon feedstock 102. Typically, the hydrocarbon feedstock is only present in mixed stream 114 in trace amounts.

Mixed stream 114 is supplied to solvent regeneration column 116 where extraction solvent can be recovered as first recovered solvent stream 117 and separated from first residue stream 123, which includes oxidized sulfur and nitrogen compounds. Optionally, mixed stream 114 can be separated in solvent regeneration column 116 into a recovered hydrocarbon stream 124, which can include hydrocarbons present in mixed stream 114 from hydrocarbon feedstock 102. Solvent regeneration column 116 can be a distillation column that is configured to separate mixed stream 114 into first recovered solvent stream 117, first residue stream 123, and recovered hydrocarbon stream 124.

Extracted hydrocarbon stream 118 can be supplied to stripper 120, which can be a distillation column or like vessel designed to separate a hydrocarbon product stream from the residual extraction solvent. In certain embodiments, a portion of mixed stream 114 can be supplied to stripper 120 via line 122, and may optionally be combined with extracted hydrocarbon stream 118. In certain embodiments, solvent regeneration column 116 can produce recovered hydrocarbon stream 124, which can be supplied to stripper 120, where the recovered hydrocarbon stream can optionally be contacted with extracted hydrocarbon stream 118 and/or a portion of mixed stream 114, which can be supplied to the stripper via line 122.

Stripper 120 separates the various streams supplied thereto into stripped oil stream 126, which includes hydrocarbons present in hydrocarbon feedstock 102 and has a reduced sulfur and nitrogen content relative thereto, and second recovered solvent stream 128.

In certain embodiments, first recovered solvent stream 117 can be combined with second recovered solvent stream 128 and recycled to extraction vessel 112. Optionally, make-up solvent stream 132, which can include fresh solvent, can be combined with first recovered solvent stream 117 and/or second recovered solvent stream 128 and supplied to extraction vessel 112. Alternately, extraction vessel 112 can be supplied completely with a polar solvent recovered from stream 117 and/or stream 128.

First residue stream 123, which includes oxidized compounds, such as oxidized sulfur and nitrogen compounds, and which can also include low concentrations of hydrocarbonaceous material, can be supplied to gasifier 130 where the first residue stream is converted to a stream comprising hydrogen, carbon monoxide, and steam, while producing recoverable energy. Specifically, oxidized compounds such as sulfones and sulfoxides are supplied to a gasifier or gasification unit. The gasifier can be an integrated unit that includes a reactor, an air separation unit, means for syngas quenching and cooling, a shift reactor, means for acid gas removal and recovery, and means for hydrogen recovery. Alternatively, air can be supplied by an air separation unit associated with an alternate process. The reactor can include a pressure shell having a reaction zone located therein, and can be bounded in part by a vertically oriented tubular membrane wall. The reaction zone can be a moving bed, fluidized bed, or entrained flow system. The tubular membrane wall can include one or more openings, and can include a slag deflector, optionally positioned above any of said openings. The reactor can include means for providing a cooling medium, such as providing an inlet end for supplying the cooling medium and an outlet end for used cooling medium.

In certain embodiments, gasifier can be operated at a temperature of greater than about 800° C., alternatively greater than about 1000° C., or alternatively between about 1200° C. and 1800° C. In certain embodiments, the gasifier is operated at a pressure of between about 10 and 125 bars, alternatively between about 30 and 100 bars, or alternatively between about 25 and 90 bars.

Oxidized sulfur containing compounds present in the hydrocarbon feedstock present, for example as sulfones, are collected as waste (first residue stream 123), supplied to gasifier 130, which converts hydrocarbon into syngas stream 134 (which includes CO+$H_2$) and hydrogen sulfide stream 136. Gasification produces no sulfur oxides or sulfur dioxides. First residue stream 123 can include small amounts of hydrocarbons and/or extraction solvent. Oxidized compounds containing oxygen minimize the use of oxygen in the gasification process, thereby reducing the supply and overall consumption of pure oxygen in the gasifier.

Syngas stream 134 can have an $H_2$:CO ratio of between about 0.85:1 and 1.2:1, alternatively between about 0.85:1 and 1:1, alternatively between about 1:1 and 1.2:1. In certain embodiments, such as for embodiments wherein syngas stream 134 is supplied to a Fischer Tropsch process, the $H_2$:CO ratio can be adjusted prior to supplying the syngas stream to an $H_2$:CO ratio of between about 1.8:1 and 2.2:1, alternatively between about 1.9:1 and 2.1:1.

Syngas stream 134 produced by gasifier 130 can be used to fuel an associated or ancillary chemical production process, such as a methanol synthesis unit, dimethyl ether synthesis unit, acetic acid synthesis unit, or like facility. Alternatively, syngas stream 134 can be supplied to a gas-to-liquid ("GTL") facility employing a conventional Fischer-Tropsch process, which converts carbon monoxide and hydrogen into liquid hydrocarbons. Utilization of a GTL facility employing a Fischer-Tropsch process allows maximum recovery of clean liquid hydrocarbons containing no sulfur, without the utilization of hydrogen during these steps, and produces elementary sulfur for further processing, use, or collection.

Within the gasifier, the following chemical reactions take place:

$$C_xH_y + O_2 \rightarrow xCO_2 + yH_2O \tag{1}$$

$$C_xH_y + \tfrac{1}{2}O_2 \rightarrow xCO + yH_2 \tag{2}$$

$$C_xH_y + H_2O \rightarrow xCO + yH_2 \tag{3}$$

$$CO + H_2O \rightarrow CO_2 + H_2 \tag{4}$$

$$CH_xH_y + H_2O \rightarrow xCH_4 \tag{5}$$

$$H_2 + S \rightarrow H_2S \tag{6}$$

Note that a small portion of the sulfur present may react to form carbonyl sulfide. Nitrogen that is typically present in the hydrocarbon feedstock forms $N_2$ (about 90%) and $NH_3$ (about 10%). Traces of HCN may also be formed in certain embodiments. In a separate reactor, the Water Gas Shift reaction takes place as follows to produce carbon dioxide and hydrogen gas:

$$CO + H_2O \rightarrow CO_2 + H_2 \tag{7}$$

Typical product yields for a gasifier that is being supplied with a petroleum based feed or pitch at rate of about 2,359 MT/day, are provided in Table 1 below. In the second column of Table 1, the make-up of the syngas stream exiting the gasifier is provided. In the third column of Table 1, the make-up of a modified syngas stream is provided, after the syngas stream has been sent to a separate reactor and it has undergone a water-gas-shift reaction, to produce a stream having an increased carbon dioxide and hydrogen concentration and a decreased carbon monoxide and water concentration.

TABLE 1

| Component | Raw Syngas, Kmol/hour Reactions 1 + 2 | After Water-Gas Shift, Kmol/hour Reactions 1 + 2 + 3 |
|---|---|---|
| $CH_4$ | 38 | 38 |
| $H_2$ | 5244 | 11080 |
| CO | 6080 | 243 |
| $CO_2$ | 827 | 6663 |
| $H_2O$ | 15845 | 10009 |
| $H_2S$ + COS | 169 | 169 |
| $N_2$ + Misc | 43 | 43 |
| Total | 28246 | 28245 |

Hydrocarbons and hydrocarbonaceous compounds that can be fed to the reactor can be converted into hydrogen and CO, and sulfur that can be present as sulfones, and refractory sulfur compounds, in the hydrocarbon feedstock can be converted to $H_2S$ and COS. Hydrogen sulfide produced by gasification can be converted to elemental sulfur according to the Claus process. The Claus process is a multi-step thermal process that converts hydrogen sulfide and oxygen into elemental sulfur and water. The overall reaction is provided as: $2H_2S + O_2 \rightarrow S_2 + 2H_2O$.

Figure 2:
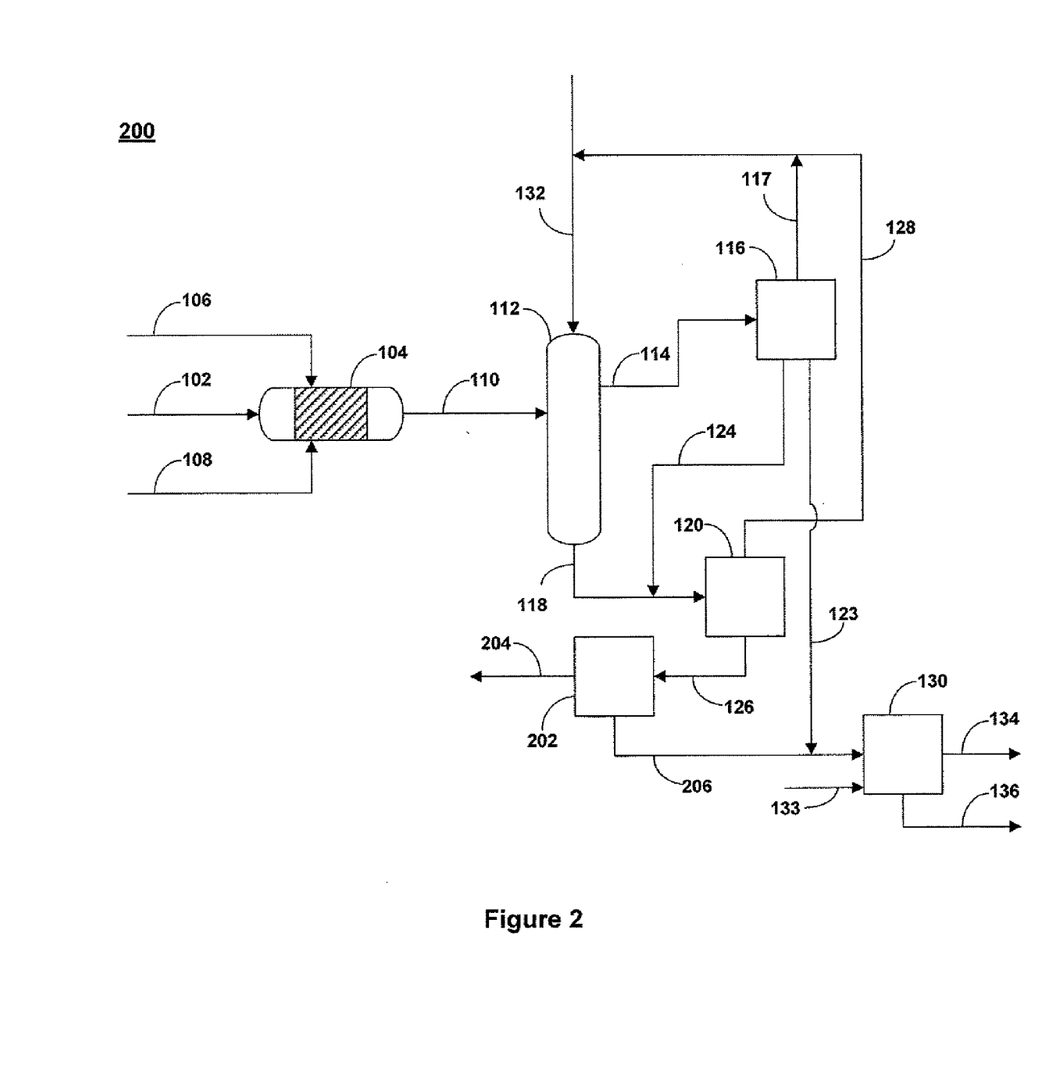
FIG. 2 provides a schematic diagram of one embodiment of the method of upgrading a hydrocarbon feedstock according to the present invention.

FIG. 2 provides another embodiment of the present invention for the upgrading of hydrocarbons. Hydrocarbon upgrading system 200 includes oxidation reactor 104, extraction vessel 112, solvent regeneration column 116, stripper 120, gasifier 130, and adsorption column 202.

As shown in FIG. 2, in certain embodiments of the invention, stripped oil stream 126 can be supplied to adsorption column 202, where the hydrocarbon containing stream can be contacted with one or more adsorbents designed to remove one or more of various impurities, such as sulfur containing compounds, oxidized sulfur containing compounds, nitrogen containing compounds, oxidized nitrogen containing compounds, and metals remaining in the hydrocarbon product stream after oxidation and solvent extraction steps.

Exemplary adsorbents can include activated carbon, silica gel, alumina, natural clays, and other inorganic adsorbents. In certain preferred embodiments, the adsorbent can include polar polymers that have been applied to or that coat various high surface area support materials, such as silica gel, alumina, and activated carbon. Exemplary polar polymers for use in coating various support materials can include polysulfones, polyacrylonitrile, polystyrene, polyester terephthalate, polyurethane, other like polymer species that exhibit an affinity for oxidized sulfur species, and combinations thereof.

The adsorption column can be operated at a temperature of between about 20° C. and 60° C., preferably between about 25° C. and 40° C., even more preferably between about 25° C. and 35° C. In certain embodiments, the adsorption column can be operated at a temperature of between about 10° C. and 40° C., alternatively between about 35° C. and 75° C. In certain embodiments, the adsorption column can be operated at temperatures of greater than about 20° C., or alternatively at temperatures less than about 60° C. The adsorption column can be operated at a pressure of up to about 15 bars, preferably up to about 10 bars, even more preferably between about 1 and 2 bars. In certain embodiments, the adsorption column can be operated at a pressure of between about 2 and 5 bars. In an exemplary embodiment, the adsorption column can be operated at a temperature of between about 25° C. and 35° C. and a pressure of between about 1 and 2 bars. The weight ratio of stripped oil to adsorbent is between about 1:1 and 20:1, preferably between about 5:1 and 15:1, such as about 10:1.

Adsorption column 202 separates the feed into extracted hydrocarbon product stream 204 having very low sulfur and very low nitrogen content and second residue stream 206. Second residue stream 206 can include oxidized sulfur and oxidized nitrogen compounds, and can optionally be combined with first residue stream 123 and supplied to gasifier 130 and processed as noted above.

The adsorbent can be regenerated by contacting spent adsorbent with a polar solvent, such as methanol or acetonitrile, to desorb the adsorbed oxidized compounds from the adsorbent. In certain embodiments, heat and/or stripping gas can also be employed to facilitate the removal of the adsorbed compounds from the adsorbent.

Figure 3:
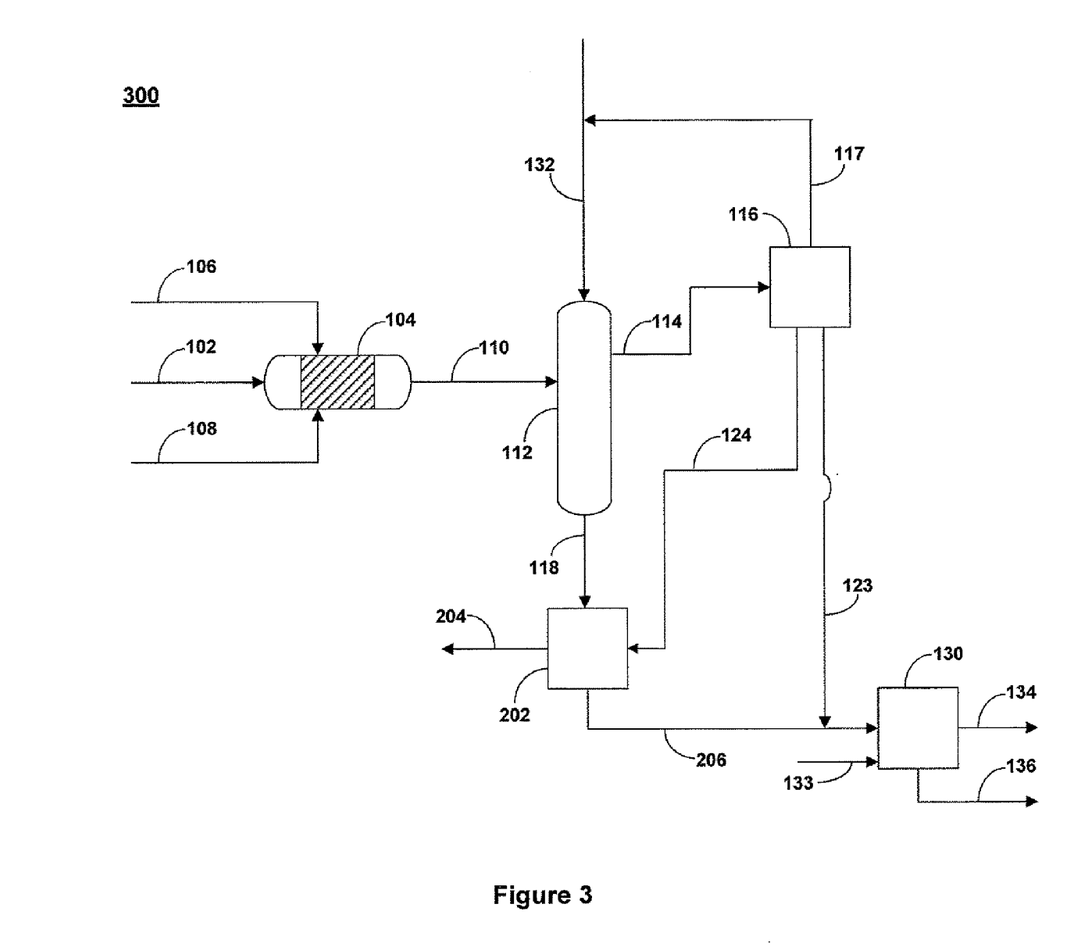
FIG. 3 provides a schematic diagram of one embodiment of the method of upgrading a hydrocarbon feedstock according to the present invention.

As shown in FIG. 3, in certain embodiments, extracted hydrocarbon stream 118 can be supplied directly from extraction vessel 112 to adsorption column 202, where the stream can be contacted with one or more adsorbent designed to remove one or more of various impurities, such as sulfur containing compounds, oxidized sulfur containing compounds, nitrogen containing compounds, oxidized nitrogen containing compounds, and metals remaining in the hydrocarbon product stream after oxidation and solvent extraction steps.

Adsorption column 202 can also be supplied with recovered hydrocarbon stream 124, which can include oil recovered from solvent regeneration column 116, wherein the stream can be contacted with the adsorbent described above.

Adsorption column 202 separates the feed into a high purity extracted hydrocarbon product stream 204 having very low sulfur and very low nitrogen content and second residue stream 206. Second residue stream 206 can include oxidized sulfur and oxidized nitrogen compounds, and can optionally be combined with first residue stream 123 and supplied to gasifier 130 and processed as noted above.

Figure 4:
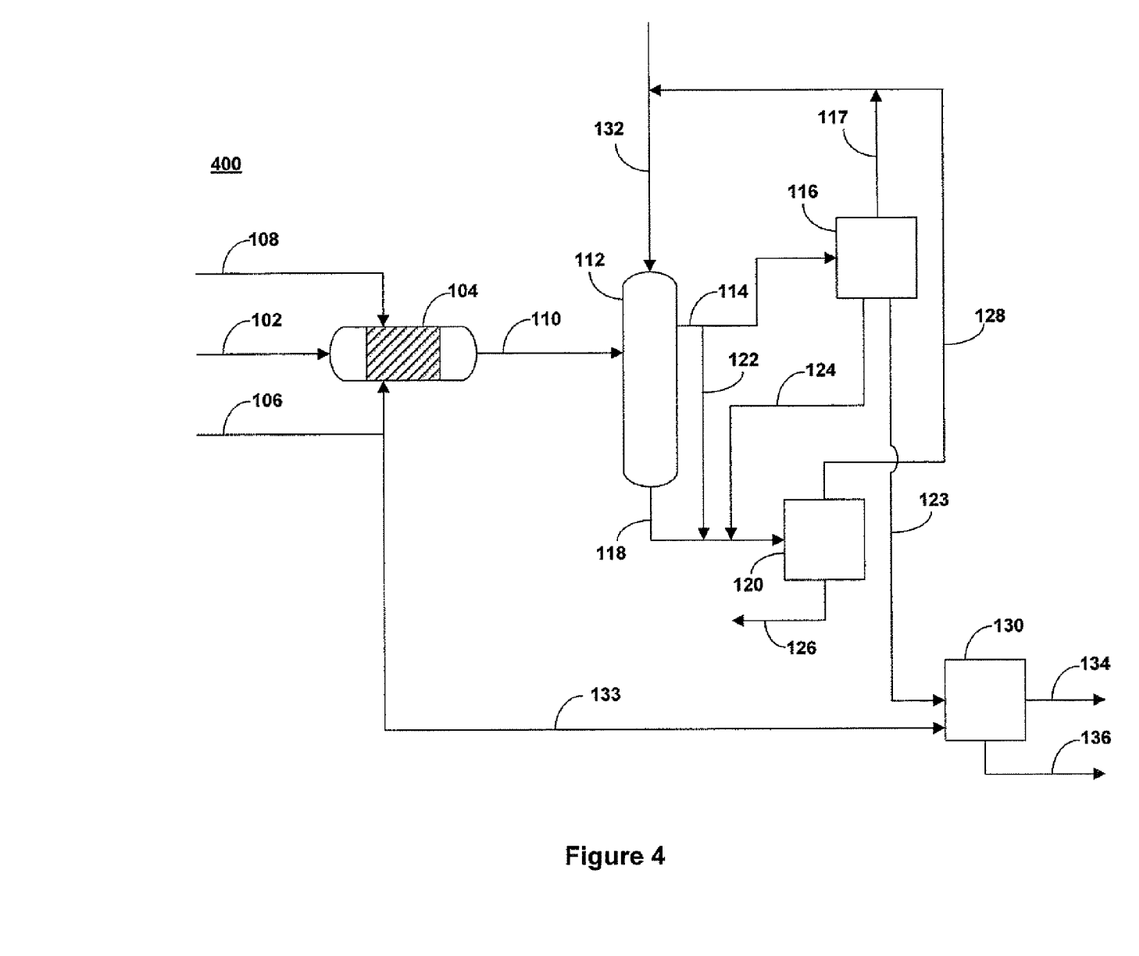
FIG. 4 provides a schematic diagram of one embodiment of the method of upgrading a hydrocarbon feedstock according to the present invention.

As shown in FIG. 4, in certain embodiments, the oxygen feed to oxidation reactor 104 can be used to supply gasifier 130, to provide synergy as oxygen can be used as both the oxidant for the desulfurization and as a reactant for the gasification process. More specifically, the oxygen which is used to gasify the vacuum residue or liquid hydrocarbon, can also be used to selectively oxidize the sulfur or nitrogen containing compounds in the liquid hydrocarbon.

Figure 5:
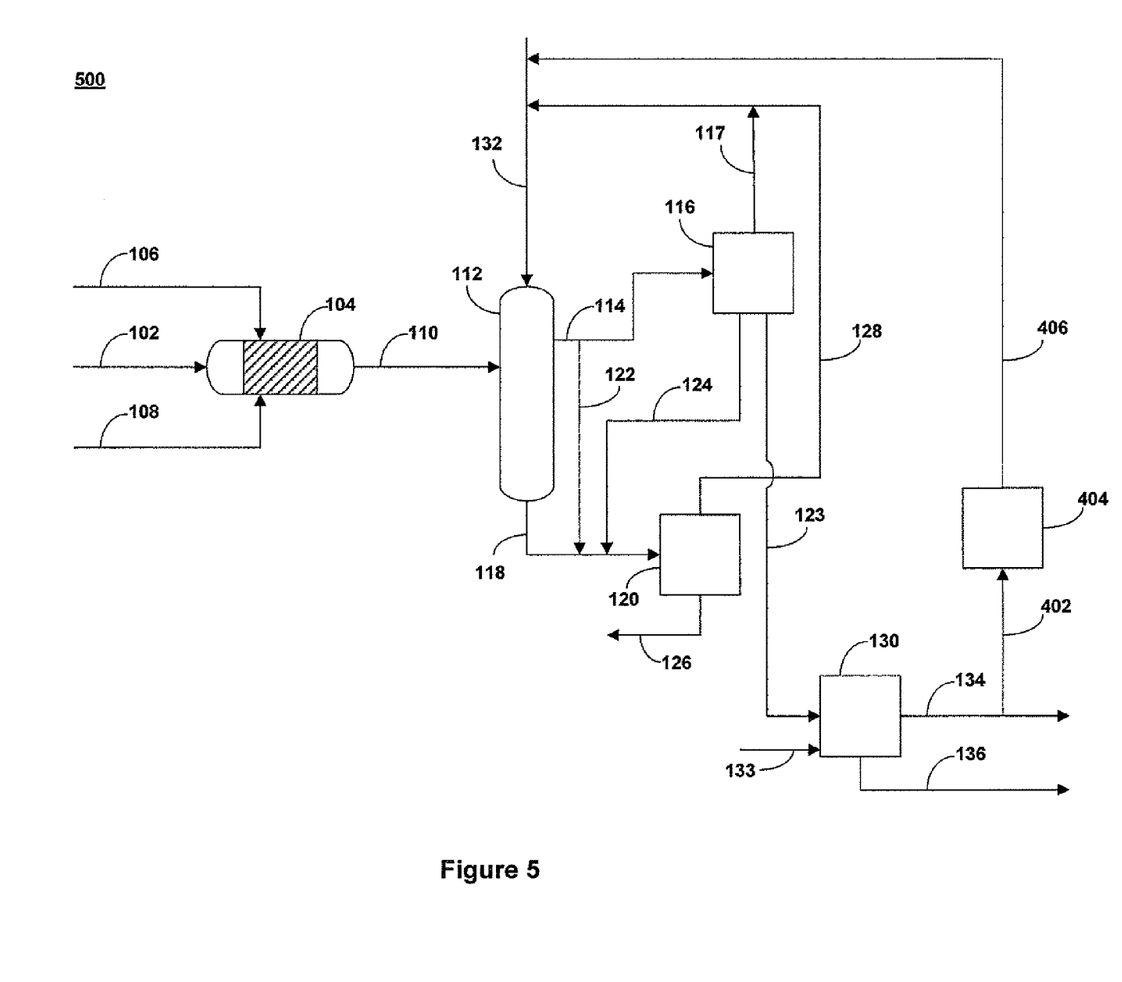
FIG. 5 provides a schematic diagram of one embodiment of the method of upgrading a hydrocarbon feedstock according to the present invention.

As shown in FIG. 5, in certain embodiments, a portion of syngas steam 134 can be supplied to an alternate process, such as a solvent synthesis unit, to produce a solvent that can be utilized for the extraction of oxidized sulfur and oxidized nitrogen compounds in extraction vessel 112. More specifically, in certain embodiments, syngas 134 can be supplied to methanol reactor 404 to prepare methanol according to the following reaction: $CO + 2H_2 \rightarrow CH_3OH$. Methanol produced in methanol synthesis unit 404 can be supplied to extraction vessel 112 via line 406, where it can optionally be combined with recycled methanol from lines 117 and/or 128.

In certain embodiments, methanol reactor 404 can include a catalyst to facilitate the preparation of methanol, such as a copper, zinc oxide, alumina catalyst. The methanol reactor can be maintained at pressures of between about 40 and 125 bars, preferably between about 50 and 100 bars, and a temperature of between about 225° C. and 400° C., preferably between about 250° C. and 350° C. Typically, the methanol reactor is operated at relatively mild conditions. Energy produced by the gasifier can be supplied to a power plant, or to an alternate or associated process.

Figure 6:
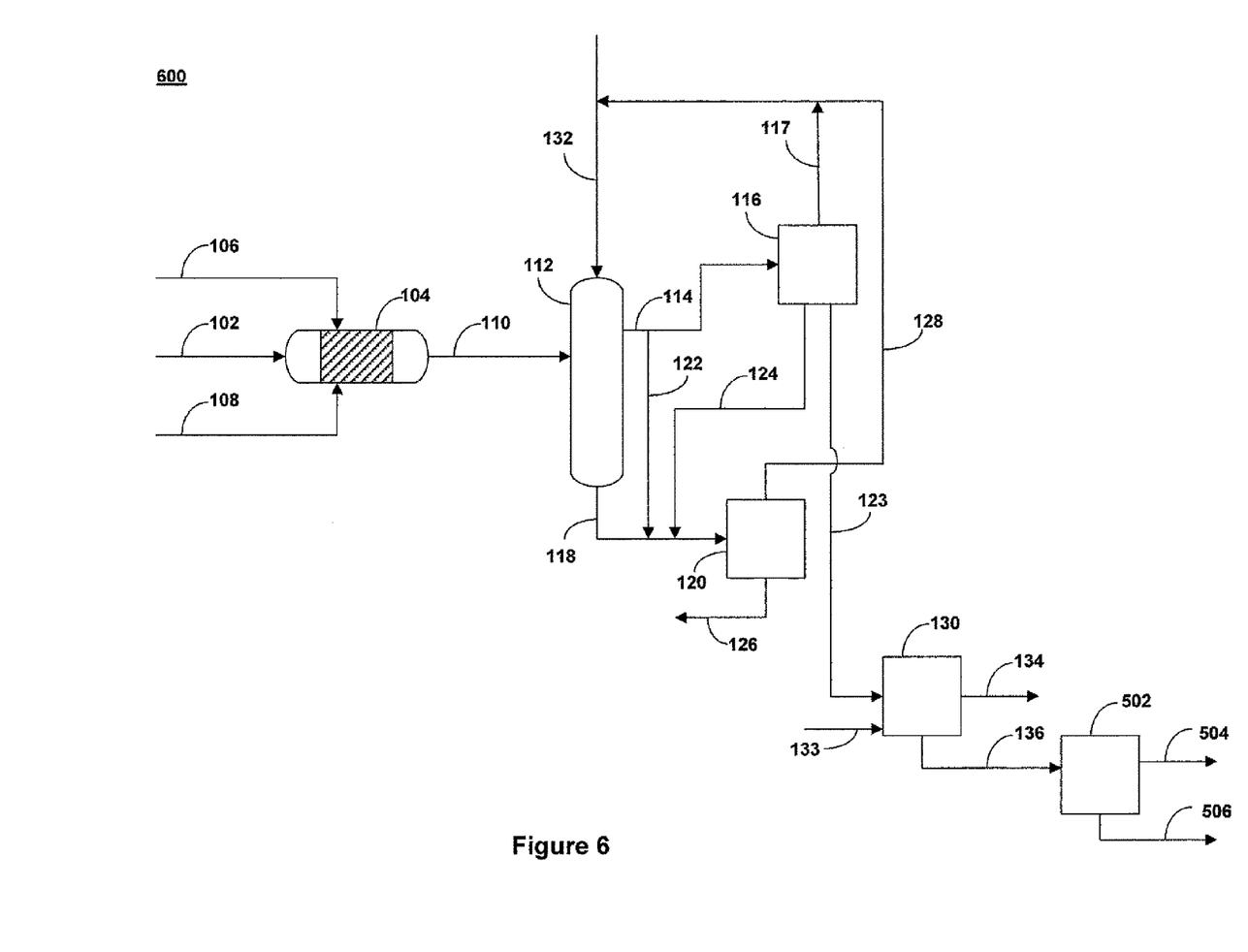
FIG. 6 provides a schematic diagram of one embodiment of the method of upgrading a hydrocarbon feedstock according to the present invention.

Referring now to FIG. 6, in another embodiment of the present invention, apparatus 600 is provided for the desulfurization of a hydrocarbon feedstock, with the subsequent recovery of elemental sulfur. Processing of hydrocarbon feedstock 102 proceeds as described above. Gasifier 130 produces hydrogen sulfide stream 136, which can be supplied to Claus unit 502. Claus unit 502 can include multi-step process equipment that is operable to recover elemental sulfur 504 from the hydrogen sulfide stream, and also produce water stream 506, which can be a steam stream. Claus unit 502 can include a catalyst to increase elemental sulfur yield. In certain embodiments, the Claus unit catalyst can include activated aluminum (III) oxide or titanium (IV) oxide. In certain embodiments, the Claus reactor can include multiple catalytic stages. Typically, Claus reactors are operated at temperatures of between about 100° C. and 500° C., alternatively between about 150° C. and 400° C. Claus unit 502 can include a sulfur condenser for recovering the elemental sulfur. Steam stream 506 can be condensed, recovered and recycled for an alternate process, or can be used in associated heat exchangers as either a heating or cooling medium.

Figure 7:
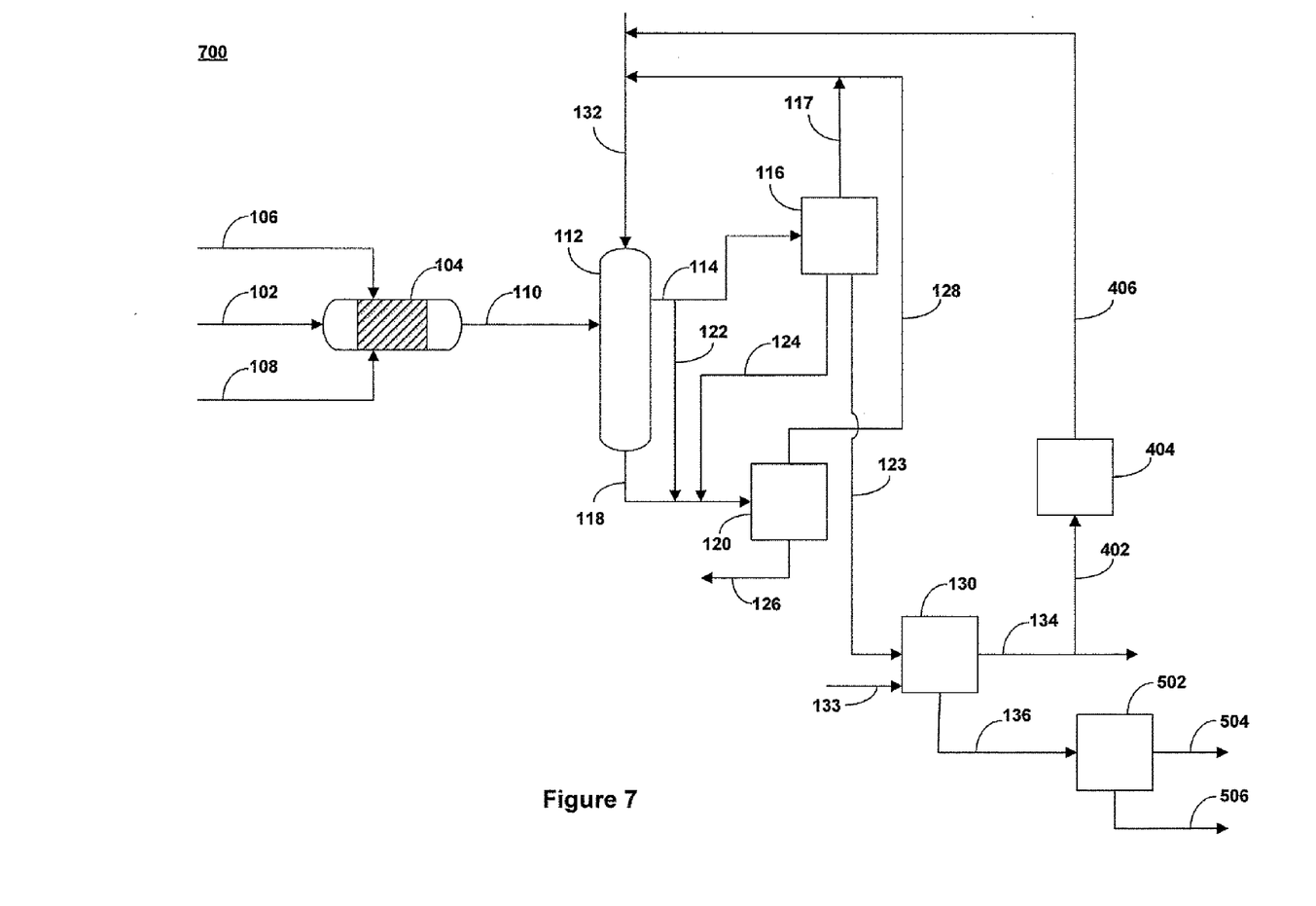
FIG. 7 provides a schematic diagram of one embodiment of the method of upgrading a hydrocarbon feedstock according to the present invention.

Referring now to FIG. 7, in another fully integrated embodiment of the present invention, apparatus 700 is provided for the desulfurization of a hydrocarbon feedstock, with the subsequent recovery of elemental sulfur and the production of methanol for use as an extraction solvent. Hydrocarbon feedstock 102 is processed as described above. Residue stream 123 is supplied to gasifier 130 where it is contacted with oxygen stream 133 and a catalyst in a reaction zone to produce syngas stream 134 and hydrogen sulfide stream 136. All or a portion of syngas stream 134 can be supplied to methanol reactor 404 to produce methanol stream 406, which can be supplied to extraction vessel 112. Alternatively, all or a portion of methanol stream 406 can be supplied to an alternate process, or the methanol can be collected for later use. Hydrogen sulfide stream 136 from gasifier 130 can be supplied to Claus unit 502, which in turn catalytically converts the hydrogen sulfide to elemental sulfur 504 and water 506.

Figure 8:
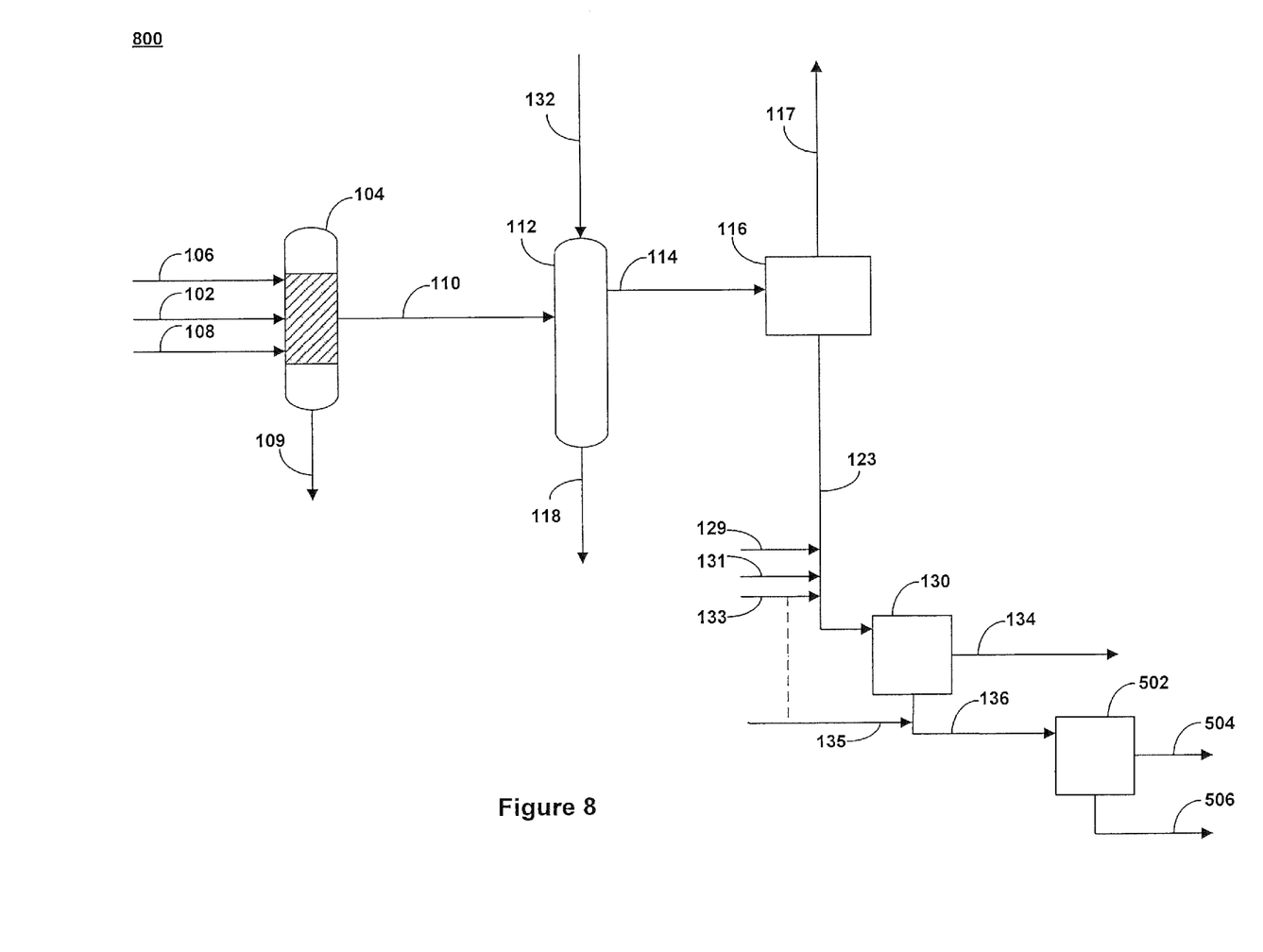
FIG. 8 provides a schematic diagram of one embodiment of the method of upgrading a hydrocarbon feedstock according to the present invention.

Referring now to FIG. 8, in another embodiment of the present invention, apparatus 800 is provided for the upgrading of a hydrocarbon feedstock. Hydrocarbon stream 102, oxidant feed stream 106 and catalyst feed stream 108 are supplied to oxidation reactor 104, which is operated as previously described herein, to produce oxidized sulfur and oxidized nitrogen containing hydrocarbon stream 110 and spent catalyst stream 109. Oxidized sulfur and oxidized nitrogen containing hydrocarbon stream 110 is supplied to extraction vessel 112 where it is contacted with extraction solvent stream 132 to produce extracted hydrocarbon stream 118, which has a lower concentration of sulfur and nitrogen containing compounds than does hydrocarbon stream 102, and mixed stream 114, which includes extraction solvent and oxidized sulfur and oxidized nitrogen containing compounds.

Mixed stream 114 is supplied to solvent regenerator 116, which can be a distillation column, where the mixed stream is heated to produce a recovered solvent stream 117 and a residue stream 123, which includes oxidized sulfur and oxidized nitrogen containing compounds.

Residue stream 123 can optionally be combined with an alternate sulfone or pitch stream 129, which can be supplied by an alternate process, water 131 and oxygen 133 and supplied to gasification reactor 130, where the mixture is heated to produce syngas stream 134 and hydrogen sulfide stream 136. Hydrogen sulfide stream 136 can be combined with oxygen 135 and supplied to Claus unit 502, where the hydrogen sulfide stream 136 and oxygen 135 are heated to produce elemental sulfur 504 and water 506, which may be in the form of steam.

In the exemplary embodiment according to FIG. 8, gasification reactor 130 in which a water gas shift reactor is included is supplied with oxidized sulfur containing stream 123 and separate pitch stream supplied via line 129 to produce synthesis gas and other gaseous products. Gastification reactor 130 is operated at a temperature of about 1045° C. The weight ratio of water to carbon was about 0.6 and the oxygen to pitch ratio was approximately 1. The material balance for the product yields are provided in Table 2 as follows:

TABLE 2

Oxidation Step

| | Stream No. | | | |
|---|---|---|---|---|
| Component | 102 Kg/h | 106 Kg/h | 108 Kg/h | 109 Kg/h |
| Water | | 852 | | 1045 |
| MeOH | | | | |
| Diesel | 171,915 | | | |
| Organic Sulfur | 481 | | | 2 |
| Acetic Acid | | | 10,641 | 9,577 |
| Hydrogen Peroxide | | 365 | | |
| Solid Catalyst | | | 860 | 860 |
| Total | 172,396 | 1217 | 11,501 | 11,484 |

Material balances for the extraction step for the exemplary embodiment according to FIG. 8 are provided in Table 3 that follows.

TABLE 3

Extraction step

| | Stream No. | | | | | |
|---|---|---|---|---|---|---|
| Component | 110 Kg/h | 132 Kg/h | 114 Kg/h | 118 Kg/h | 117 Kg/h | 123 Kg/h |
| Water | | | | | | |
| MeOH | | 266,931 | 265,240 | 1691 | 265,240 | |
| Diesel | 171,915 | | 17,191 | 154,724 | | 17,191 |
| Organic Sulfur | 481 | | 476 | 5 | | 476 |
| Acetic Acid | | | | | | |
| Solid Catalyst | | | | | | |
| Total | 172,396 | 266,931 | 282,907 | 156,420 | 265,420 | 17,667 |

In the exemplary embodiment according to FIG. 8, gasification reactor 130 is supplied with oxidized sulfur containing stream 123 and separate pitch stream supplied via line 129. Gasification reactor 130 is operated at a temperature of about 1045° C. The weight ratio of water to carbon was about 0.6, and the oxygen to pitch ratio was approximately 1. The output of the gasification reactor 130 is supplied to the Claus unit 502. The material balance for the product yields are provided in Table 4 as follows:

TABLE 4

Product Yields.

| Component | Stream No. | | | | | |
|---|---|---|---|---|---|---|
| | 123 Kg/h | 124 Kg/h | 133 Kg/h | 131 Kg/h | 134 Kg/h | 136 Kg/h |
| Pitch/Sulfone | 102.6 | 1000 | | | | |
| Pitch/Sulfone (HC) | 102.4 | 937.1 | | | | |
| $O_2$ | | | 1000 | | | |
| $H_2/CO$ | | | | | | |
| $CH_4$ | | | | | 6.2 | |
| $H_2$ | | | | | 229 | |
| CO | | | | | 69.4 | |
| $CO_2$ | | | | | 2995.9 | |
| $H_2O$ | | | | 3176.8 | 1738.9 | |
| $H_2S$ | | | | | | 52.5 |
| COS | | | | | 10.3 | |
| $N_2$ | | | | | 14.2 | |
| Ar | | | | | | |
| $NH_3$ | | | | | 0.8 | |
| Total | 102.6 | 1000 | 1000 | 3176.8 | 5064.7 | 52.5 |

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

That which is claimed is:

1. A method of upgrading a hydrocarbon feedstock, the method comprising the steps of:
   supplying the hydrocarbon feedstock to an oxidation reactor, the hydrocarbon feedstock comprising sulfur compounds;
   contacting the hydrocarbon feedstock with an oxidant in the presence of a catalyst in the oxidation reactor under conditions sufficient to selectively oxidize sulfur compounds present in the hydrocarbon feedstock to produce an oxidized hydrocarbon stream that comprises hydrocarbons and oxidized sulfur compounds;
   separating the hydrocarbons and the oxidized sulfur compounds in the oxidized hydrocarbon stream by solvent extraction with a non-acidic polar organic solvent, the non-acidic polar organic solvent being dimethylformamide, to produce an extracted hydrocarbon stream and a mixed stream, the mixed stream comprising the non-acidic polar organic solvent and the oxidized sulfur compounds, wherein the extracted hydrocarbon stream has a lower concentration of sulfur compounds than the hydrocarbon feedstock;
   separating the mixed stream using a distillation column into a first recovered non-acidic polar organic solvent stream and a first residue stream;
   supplying the first residue stream to a gasifier to produce a syngas stream and a hydrogen sulfide stream;
   supplying the extracted hydrocarbon stream to a stripper to produce a second recovered non-acidic polar organic solvent stream and a stripped oil stream; and
   recycling the first recovered non-acidic polar organic solvent stream and the second non-acidic polar organic solvent stream to an extraction vessel for the step of separating the hydrocarbons and the oxidized sulfur compounds in the oxidized hydrocarbon stream.

2. The method of claim 1, wherein the oxidant is selected from the group consisting of air, oxygen, ozone, nitrous oxide, peroxides, hydroperoxides, organic peracids, and combinations thereof.

3. The method of claim 1, wherein the oxidation reactor catalyst is a metal oxide having the formula $M_xO_y$, wherein M is an element selected from Groups IVB, VB, and VIB of the periodic table.

4. The method of claim 1, wherein the oxidation, reactor is maintained at a temperature of between about 20 and 150° C. and at a pressure of between about 1-10 bars.

5. The method of claim 1, wherein the ratio of the oxidant to sulfur compounds present in the hydrocarbon feedstock is between about 4:1 and 10:1.

6. The method of claim 1, wherein the non-acidic polar organic solvent has a Hildebrandt value of greater than about 19.

7. The method of claim 1, wherein the solvent extraction is conducted at a temperature of between about 20° C. and 60° C. and at a pressure of between about 1-10 bars.

8. The method of claim 1, further comprising the step of supplying the extracted hydrocarbon stream to an adsorption column, the adsorption column being charged with an adsorbent suitable for the removal of oxidized compounds present in the extracted hydrocarbon stream, the adsorption column producing a high purity hydrocarbon product stream and a second residue stream, the second residue stream containing a portion of the oxidized compounds.

9. The method of claim 1, further comprising the step of supplying stripped oil stream to an adsorption column, the adsorption column being charged with an adsorbent suitable for the removal of oxidized compounds present in the stripped oil stream, the adsorption column producing a high purity hydrocarbon product stream and a second residue stream, the second residue stream containing a portion of the oxidized compounds.

10. The method of claim 1, further comprising supplying the second residue stream to gasifier.

11. The method of claim 1, wherein the adsorbent is selected from the group consisting of activated carbon, silica gel, alumina, natural clays, and combinations of the same.

12. The method of claim 1, wherein the adsorbent is a polymer coated support, wherein the support has a high surface area and is selected from the group consisting of silica gel, alumina, and activated carbon, and the polymer is selected from the group consisting of polysulfone, polyacrylonitrile, polystyrene, polyester terephthalate, polyurethane and combinations of the same.

13. A method of providing a desulfurized hydrocarbon stream, and a syngas stream, from a sulfur containing hydrocarbon feedstock, the method comprising the steps of:
supplying the hydrocarbon feedstock to an oxidation reactor, the hydrocarbon feedstock comprising sulfur compounds;
catalytically oxidizing the sulfur compounds present in the hydrocarbon feedstock in the oxidation reactor with an oxidant in the presence of a catalyst under conditions sufficient to selectively oxidize at least a portion of the sulfur compounds present in the hydrocarbon feedstock to sulfones and produce an oxidized hydrocarbon stream comprising hydrocarbons and sulfones;
selectively extracting the oxidized hydrocarbon stream with a non-acidic polar organic solvent, the non-acidic polar organic solvent being dimethylformamide to produce an extracted hydrocarbon stream and a mixed stream, the mixed stream comprising the non-acidic polar organic solvent and the sulfones, wherein the extracted hydrocarbon stream has a lower sulfur concentration than the hydrocarbon feedstock;
separating the mixed stream using a distillation column into a first recovered non-acidic polar organic solvent stream and a first residue stream comprising the sulfones;
supplying the extracted hydrocarbon stream to a stripper, the stripper being operable to separate the extracted hydrocarbon stream into a stripped oil stream and a second recovered non-acidic polar organic solvent stream;
recycling at least one of the first recovered non-acidic polar organic solvent stream and second recovered non-acidic polar organic solvent stream to the extraction step; and
supplying the residue stream comprising sulfones to a gasifier and oxidizing the residue stream with an oxidant to produce a syngas stream and a hydrogen sulfide stream.

14. The method of claim 13, the method further comprising the steps of:
supplying at least a portion of the syngas stream to a methanol production unit, wherein the syngas stream is catalytically converted into methanol;
supplying the methanol as the non-acidic polar organic solvent for extraction of the oxidized hydrocarbon stream.

15. The method of claim 13, further comprising the steps of:
supplying the hydrogen sulfide stream to a Claus unit, wherein the hydrogen sulfide is contacted with a catalyst at elevated temperatures to produce a solid elemental sulfur product.

16. The method of claim 13 wherein the oxidant supplied to the oxidation reactor and the gasifier are oxygen.

17. The method of claim 13, further comprising the step of supplying the extracted hydrocarbon stream to an adsorption column, the adsorption column being charged with an adsorbent suitable for the removal of oxidized compounds present in the extracted hydrocarbon stream, the adsorption column producing a high purity hydrocarbon product stream and a second residue stream, the second residue stream containing a portion of the oxidized compounds.

18. The method of claim 13, further comprising supplying the second residue stream to the gasifier.

19. A method of providing a desulfurized hydrocarbon stream, and a syngas stream, from a sulfur containing hydrocarbon feedstock, the method comprising the steps of:
supplying the sulfur containing hydrocarbon feedstock and an oxidant to an oxidation reactor, said oxidation reactor being charged with a catalyst;
catalytically oxidizing the sulfur compounds present in the hydrocarbon feedstock under conditions sufficient to selectively oxidize at least a portion of the sulfur compounds present in the hydrocarbon feedstock to sulfones and produce an oxidized hydrocarbon stream comprising hydrocarbons and sulfones;
selectively extracting the oxidized hydrocarbon stream with a non-acidic polar organic solvent, the non-acidic polar organic solvent being dimethylformamide, to produce an extracted hydrocarbon stream and a mixed stream, the mixed stream comprising the non-acidic polar organic solvent and the sulfones, wherein the extracted hydrocarbon stream has a lower sulfur concentration than the hydrocarbon feedstock;
separating the mixed stream using a distillation column into a first recovered non-acidic polar organic solvent stream and a first residue stream comprising the sulfones;
supplying the extracted hydrocarbon stream to a stripper, the stripper being operable to separate the extracted hydrocarbon stream into a stripped oil stream and a second recovered non-acidic polar organic solvent stream;
recycling at least one of the first recovered non-acidic polar organic solvent stream and second recovered non-acidic polar organic solvent stream to the extraction step;
supplying the stripped oil stream to an adsorber charged with an adsorbent to produce a high purity hydrocarbon product stream and a second residue stream comprising a portion of the oxidized compounds, said adsorbent being suitable for the removal of oxidized compounds present in stripped oil stream;
supplying the residue stream comprising sulfones to a gasifier and oxidizing the residue stream with an oxidant to produce a syngas stream and a hydrogen sulfide stream; and
supplying the hydrogen sulfide to a catalytically charged Claus reactor to produce elemental sulfur.

* * * * *